(12) United States Patent
Troy et al.

(10) Patent No.: US 8,199,194 B2
(45) Date of Patent: *Jun. 12, 2012

(54) METHOD AND SYSTEM INVOLVING CONTROLLING A VIDEO CAMERA TO TRACK A MOVABLE TARGET OBJECT

(75) Inventors: James J. Troy, Issaquah, WA (US); Scott W. Lea, Renton, WA (US); Gary E. Georgeson, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 918 days.

This patent is subject to a terminal disclaimer.

(21) Appl. No.: 12/246,727

(22) Filed: Oct. 7, 2008

(65) Prior Publication Data

US 2010/0085437 A1 Apr. 8, 2010

(51) Int. Cl.
*G06K 9/36* (2006.01)
(52) U.S. Cl. .............................. 348/94; 348/95; 382/291
(58) Field of Classification Search .................... 348/94, 348/95; 382/291
See application file for complete search history.

(56) References Cited

U.S. PATENT DOCUMENTS

| | | | |
|---|---|---|---|
| 5,023,709 A | 6/1991 | Kita et al. | |
| 5,521,843 A | 5/1996 | Hashima et al. | |
| 7,120,524 B2 * | 10/2006 | Srack et al. | 701/33 |
| 7,193,645 B1 * | 3/2007 | Aagaard et al. | 348/211.3 |
| 7,680,301 B2 * | 3/2010 | Pendleton et al. | 382/103 |
| 2002/0051057 A1 * | 5/2002 | Yata | 348/142 |

FOREIGN PATENT DOCUMENTS

| | | |
|---|---|---|
| EP | 0814344 | 12/1997 |
| GB | 2375682 | 11/2002 |
| WO | 82/00515 | 2/1982 |
| WO | 2006/030444 | 3/2006 |

OTHER PUBLICATIONS

Web page featuring Leica Geosystems—Leica Absolute Tracker™ All-New Groundbreaking Laser Tracker Systems www.leica-geosystems.com (date of first publication unknown).
Web page featuring Leica Geosystems—Leica TPS1200+ The Total Station with the Plus www.leica-geosystems.com (date of first publication unknown).
Web page featuring Leica Geosystems—Leica DISTO™ A8 the visionary one—for in and outdoors www.leica-geosystems.com (date of first publication unknown).

(Continued)

*Primary Examiner* — Kevin Bates
(74) *Attorney, Agent, or Firm* — Dennis Plank

(57) ABSTRACT

Methods are described for controlling orientation of an aim point axis of a video camera having an instrument coordinate system to track a point of interest on a movable target object and calculating positions of the point of interest in a local coordinate system in which the target object is moving. The methods include measuring pan and tilt angles of the aim point axis and distance substantially along the aim point axis and calculating a calibration matrix which transforms a position defined in the instrument coordinate system to a position defined in the local coordinate system. A system is described including an instrument and at least one computer, wherein the instrument includes a video camera and a range finder, and wherein the video camera includes an aim point axis having an adjustable orientation. In one example, the target object is adapted to move on and inspect an airplane surface.

16 Claims, 8 Drawing Sheets

OTHER PUBLICATIONS

Web page featuring Leica Geosystems—Leica Red Line—The World's most versatile Construction Site positioning range www.leica-geosystems.com (date of first publication unknown).

Web page featuring Leica Geosystems—Leica Builder T100/T200; R100/R200; R100M/R200M www.leica-geosystems.com (date of first publication unknown).

Web page featuring Leica Geosystems—Leica Dimensional Control Program—Application Software DCP www.leica-geosystems.com (date of first publication unknown).

Web page featuring ViconBlade, Vicon Motion Systems www.vicon.com (date of first publication unknown).

Web page featuring MotionAnalysis—The Industry Leader for 3D Passive Optical Motion Capture—Raptor-4 Digital RealTime System www.MotionAnalysis.com (date of first publication unknown).

Web page featuring ProCollector and ProCommander—a dynamic duo of laser power. www.SL-Laser.com (date of first publication unknown).

Web page featuring ProDirector XS—When Size Matters http:www.laserprojection.com/na/m_ProDirector4.htm (date of first publication unknown).

Web page featuring Laser Projection Technologies, Inc. LPT1; LPT 10; LPT 100 Laser Radar Project http://www.lptcorp.com/ (date of first publication unknown).

Web page featuring The CMUcam1 Vision Sensor http://www.cs.cmu.edu/~cmucam/home.html (date of first publication unknown).

Web page featuring the CMUcam2 http://www.cs.cmu.edu/~cmucam2/ (date of first publication unknown).

Web page featuring CMUcam3: Open Source Programmable Embedded Color Vision Platform http://www.cmucam.org (date of first publication unknown).

Web page featuring ARToolKit http://www.hiti.washington.edu/artoolkit/ (date of first publication unknown).

Web page featuring Leica Geosystems—Dimensional Control Program—Application Software DCP http://www.leica-geosystems.com/corporate/en/productsisoftware/lgs_1669.htm (date of first publication unknown).

PCT, International Search Report, International Application No. PCT/US2009/059854 (mailed Apr. 16, 2010; published Jun. 17, 2010).

PCT, Written Opinion, International Application No. PCT/US2009/059854 (mailed Apr. 16, 2010).

PCT, International Preliminary Report on Patentability, International Application No. PCT/US2009/059854 (Apr. 21, 2011).

* cited by examiner

METHOD AND SYSTEM INVOLVING CONTROLLING A VIDEO CAMERA TO TRACK A MOVABLE TARGET OBJECT

CROSS REFERENCE TO RELATED APPLICATIONS

The present application is related to U.S. patent application Ser. No. 11/863,755 filed Sep. 28, 2007, the entire disclosure of which is incorporated herein by reference.

FIELD

The present invention relates generally to video cameras, and more particularly to a method and a system involving controlling a video camera to track a movable target object.

BACKGROUND

Real-time tracking of a target object in a reference frame that is independent of the measurement device can have applications in a variety of fields ranging from engineering to sports. A system that is easy to set up and use and is affordable would enable many types of dynamic tacking applications which may have been hard to justify using existing systems. There are costly, commercially available instrument tracking systems that involve video camera based systems or laser-based systems which allow the instrument to track a movable object. Examples of video camera based systems include multi-camera motion capture systems, single camera pixel-based image systems, and single camera position and orientation object tracking software. Examples of laser-based systems include interferometer based trackers, electronic distance measurement systems, and surveying and construction equipment laser systems. Some of the existing systems can control an instrument to track a movable target object in a local coordinate system in which the target object is moving, but they have a high cost and are not very portable or easy to set up and use.

What is needed is an improved method and system involving controlling a video camera to track a movable target object and to calculate the position of the target object in a local coordinate system in which the target object is moving.

SUMMARY

A first method is for controlling orientation of an aim point axis of a video camera having an instrument coordinate system to track a point of interest on a surface of a movable target object and for calculating positions of the point of interest in a local coordinate system in which the target object is moving, wherein the video camera captures a pixel-based image including at least a portion of the target object including the point of interest when the aim point axis is aligned with the point of interest. The first method includes steps a) through l). Step a) includes calculating a calibration matrix which transforms a position defined in the instrument coordinate system to a position defined in the local coordinate system. Step b) includes aligning the aim point axis of the video camera to a first position of the point of interest in the instrument coordinate system wherein the point of interest is centered on a reference pixel in the pixel-based image. Step c) includes measuring pan and tilt angles of the aim point axis in the instrument coordinate system when the aim point axis is aligned with the first position of the point of interest. Step d) includes measuring a distance substantially along the aim point axis from the video camera to the point of interest corresponding to the first position of the point of interest. Step e) includes calculating the first position of the point of interest in the local coordinate system using at least the calibration matrix and the measured pan and tilt angles and distance corresponding to the first position of the point of interest. Step f) includes storing the calculated first position of the point of interest. Step g) includes determining the point of interest in the pixel-based image and determining a change in pixel position of the point of interest from the reference pixel in the pixel-based image caused by movement of the point of interest to a second position in the local coordinate system. Step h) includes calculating a pan angle and a tilt angle in the instrument coordinate system to align the aim point axis of the video camera with the second position of the point of interest in the instrument coordinate system for the aim point axis to become re-centered on the reference pixel in the pixel-based image using at least the determined change in pixel position of the point of interest from the reference pixel in the pixel-based image. Step i) includes rotating the aim point axis of the video camera to the calculated pan (azimuth) angle and the calculated tilt (elevation) angle. Step j) includes measuring a distance substantially along the aim point axis from the video camera to the second position of the point of interest. Step k) includes calculating the second position of the point of interest in the local coordinate system using at least the calibration matrix and measured or calculated pan and tilt angles and the measured distance corresponding to the second position of the point of interest. Step l) includes storing the calculated second position of the point of interest.

A second method is for controlling orientation of an aim point axis of a video camera having an instrument coordinate system to track a point of interest on a surface of a movable target object and for calculating positions of the point of interest in a local coordinate system in which the target object is moving, wherein the video camera captures a pixel-based image including at least a portion of the target object including the point of interest when the aim point axis is aligned with the point of interest. The second method includes steps a) through l). Step a) includes calculating a calibration matrix which transforms a position defined in the instrument coordinate system to a position defined in the local coordinate system. Step b) includes aligning the aim point axis of the video camera to a first position of the point of interest in the instrument coordinate system wherein the point of interest is centered on a reference pixel in the pixel-based image. Step c) includes measuring first pan and tilt angles of the aim point axis in the instrument coordinate system when the aim point axis is aligned with the first position of the point of interest. Step d) includes measuring a first distance substantially along the aim point axis from the video camera to the point of interest corresponding to the first position of the point of interest. Step e) includes calculating the first position of the point of interest in the local coordinate system using at least the calibration matrix and the first measured pan and tilt angles and distance corresponding to the first position of the point of interest. Step f) includes storing the calculated first position of the point of interest. Step g) includes detecting changes in pixel position of the point of interest from the reference pixel in the pixel-based image caused by movement of the point of interest in the local coordinate system. Step h) includes using at least the detected changes in pixel position of the point of interest to continuously adjust the pan angle and the tilt angle of the aim point axis of the video camera in the instrument coordinate system to move the aim point axis of the video camera in a direction toward the point of interest on the target object. Step i) includes measuring a plurality of real-time pan angles and tilt angles of the aim point axis in the instrument coordinate system. Step j) includes measuring a plurality of real-time distances substantially along the aim point axis from the video camera to the point of interest when the aim point axis is aligned with the point of interest. Step k) includes calculating a plurality of positions of the point of interest in the local coordinate system, including a second position of the point of interest in the local coordinate system, using at least the calibration matrix and the real-time measurements of the plurality of pan angles, tilt angles, and distances. Step l) includes storing the calculated plurality of positions of the point of interest.

An expression of a first embodiment is for a system including an instrument and at least one computer. The instrument includes a video camera and a range finder. The video camera includes an aim point axis having an adjustable orientation and includes an instrument coordinate system. The at-least-one computer is operatively connected to the video camera and the range finder. The at-least-one computer is adapted to: (1) continuously align the aim point axis of the video camera with a point of interest on a surface of a movable target object using at least pixel-based images which are captured by the video camera and which include the point of interest; (2) calculate a calibration matrix which transforms a position in the instrument coordinate system to a position in a local coordinate system in which the target object is moving; (3) receive signals from the instrument corresponding to real-time measurements of orientation of the aim point axis in the instrument coordinate system when the aim point axis is aligned with the point of interest; (4) receive signals from the range finder corresponding to real-time measurements of distance from the instrument substantially along the aim point axis to the point of interest; (5) calculate a plurality of positions of the point of interest in the local coordinate system using at least the calibration matrix and the real-time measurements of orientation and distance corresponding to the point of interest; and (6) store the plurality of calculated positions of the point of interest.

Several benefits and advantages are derived from one or more of the methods and expression of the first embodiment. In one example, using a pixel-based image for controlling the pan and tilt angles of the aim point axis of the video camera for tracking the target object and using pan and tilt angles and distance substantially along the aim point axis of the video camera together with the calibration matrix for determining position in local coordinates allows for a faster method and a more portable, easier to set up and use, and less costly system for dynamically tracking a target object and determining the position of a point of interest on the target object in a local coordinate system.

DRAWINGS

FIG. 1 is a schematic, perspective view of an illustrative embodiment of a system and a movable target object, wherein the system includes an instrument and at least one computer, and wherein the instrument includes a video camera and a range finder;

FIG. 2 is a diagram of an illustrative embodiment of an instrument coordinate system {A} and a local coordinate system {B} showing a position vector $^{A}P$ extending from the origin of the instrument coordinate system substantially along the aim point axis of the instrument to a point of interest P and showing a position vector $^{B}P$ extending from the origin of the local coordinate system to the point of interest P;

Figure 7A:
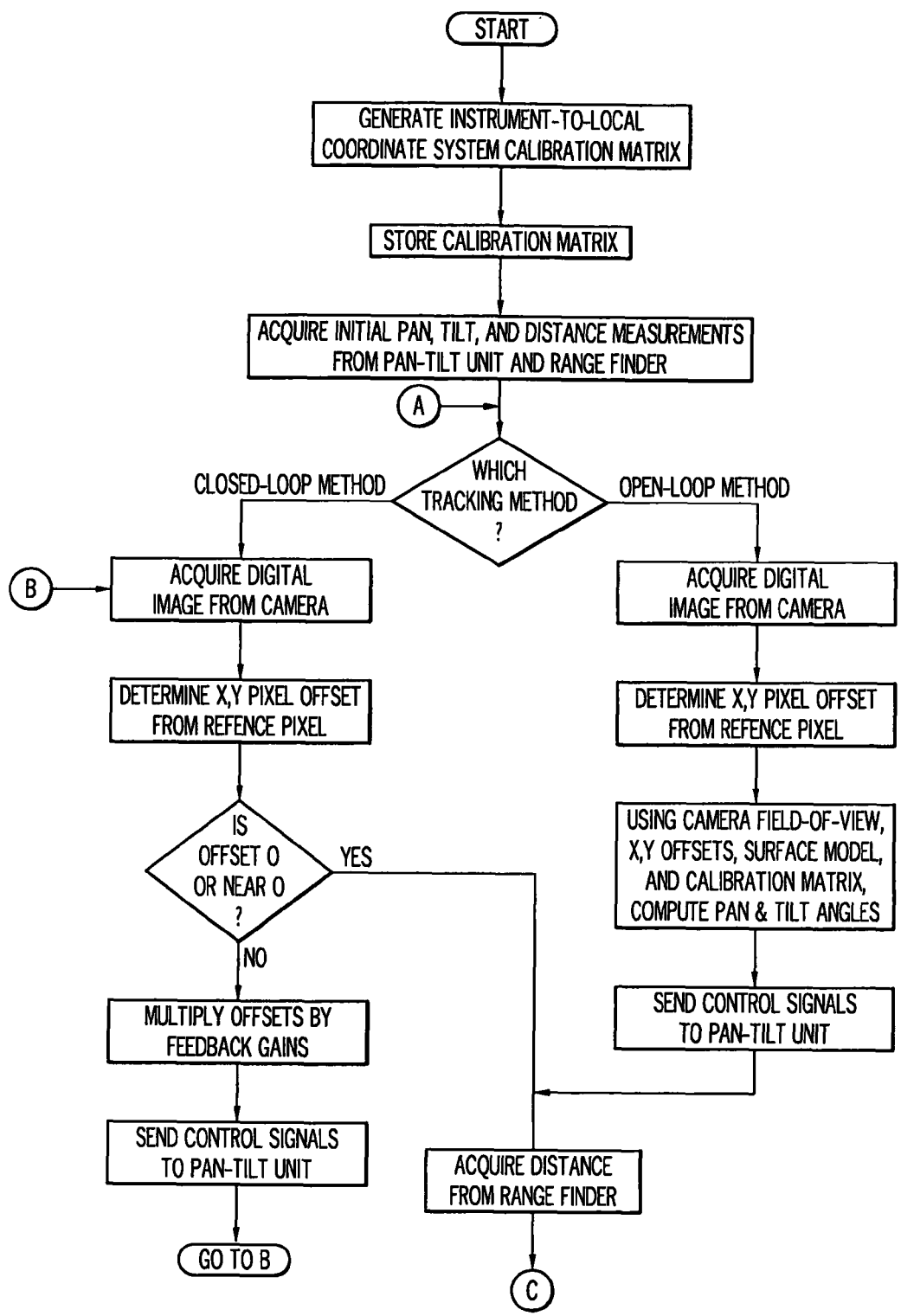
Figure 7B:
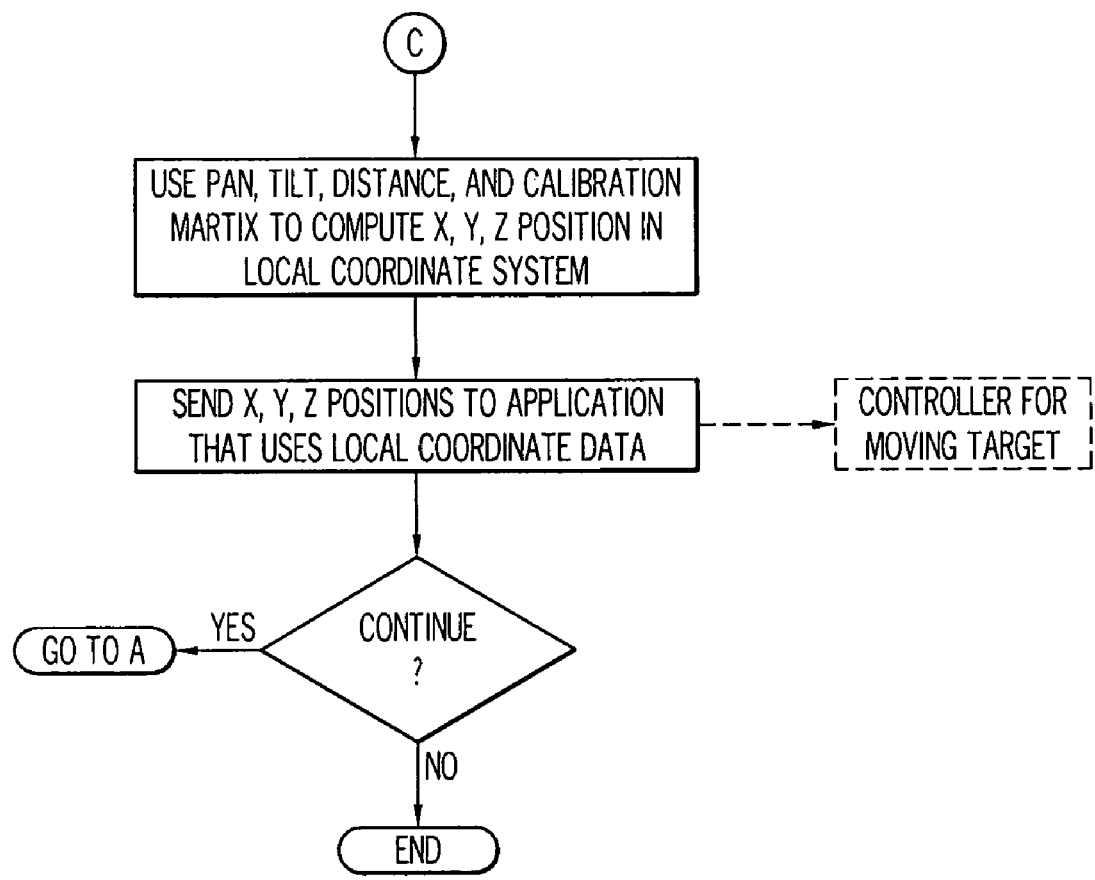
Figure 8:
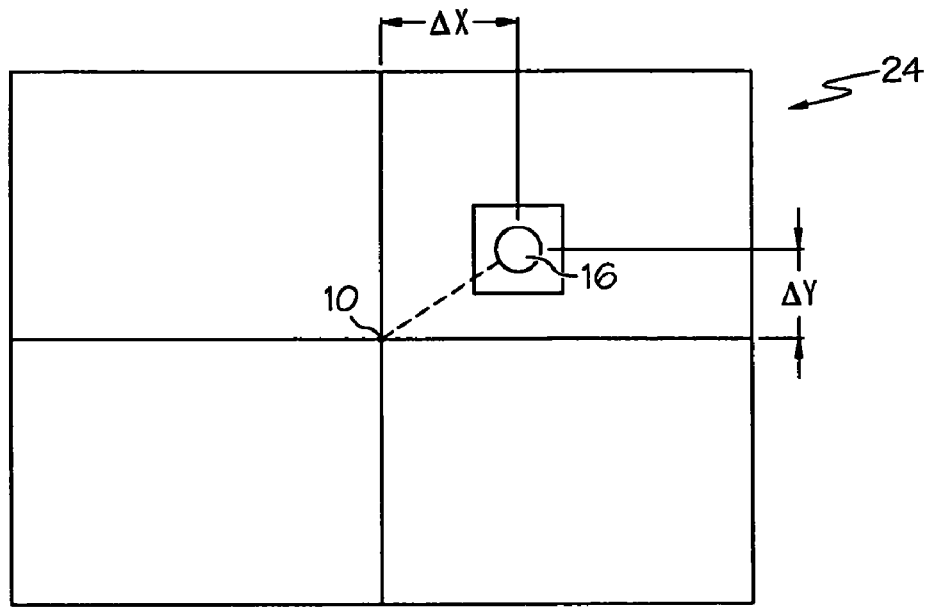
Figure 9:
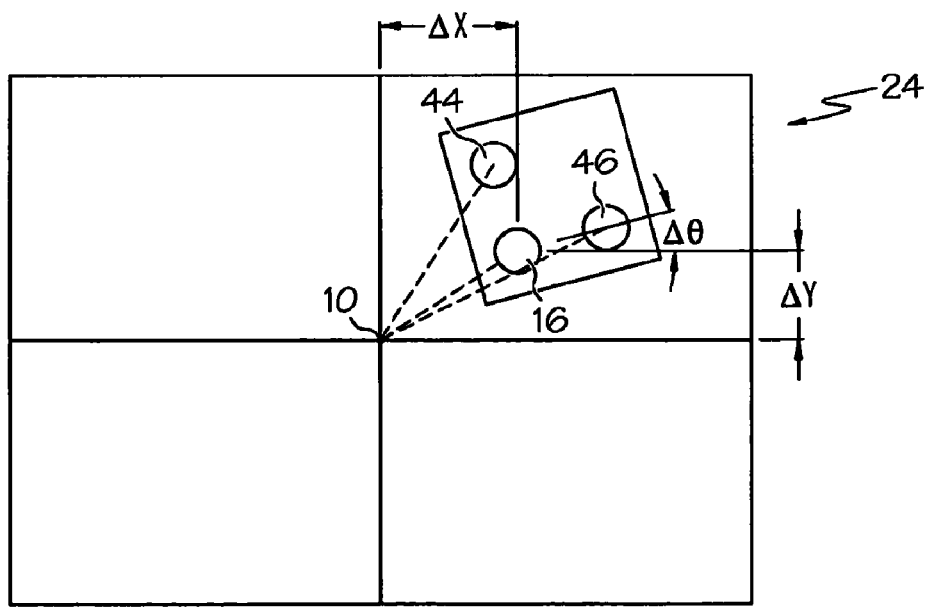

FIGS. 7A and 7B together depict an illustration of a process flow diagram which describes one example of a particular method involving real-time tracking of a target object in a local coordinate system in which the target object is moving;

FIG. 8 is an explanatory diagram of an example of a pixel-based image helpful in understanding an illustrative method for calculating changes in pan and tilt angles to keep the aim point axis of the video camera aligned with a point of interest on the moving target object; and FIG. 9 is an explanatory diagram of an example of a pixel-based image helpful in understanding an illustrative method for calculating changes in orientation of the moving target object about the point of interest on the target object.

DESCRIPTION

Figure 1:
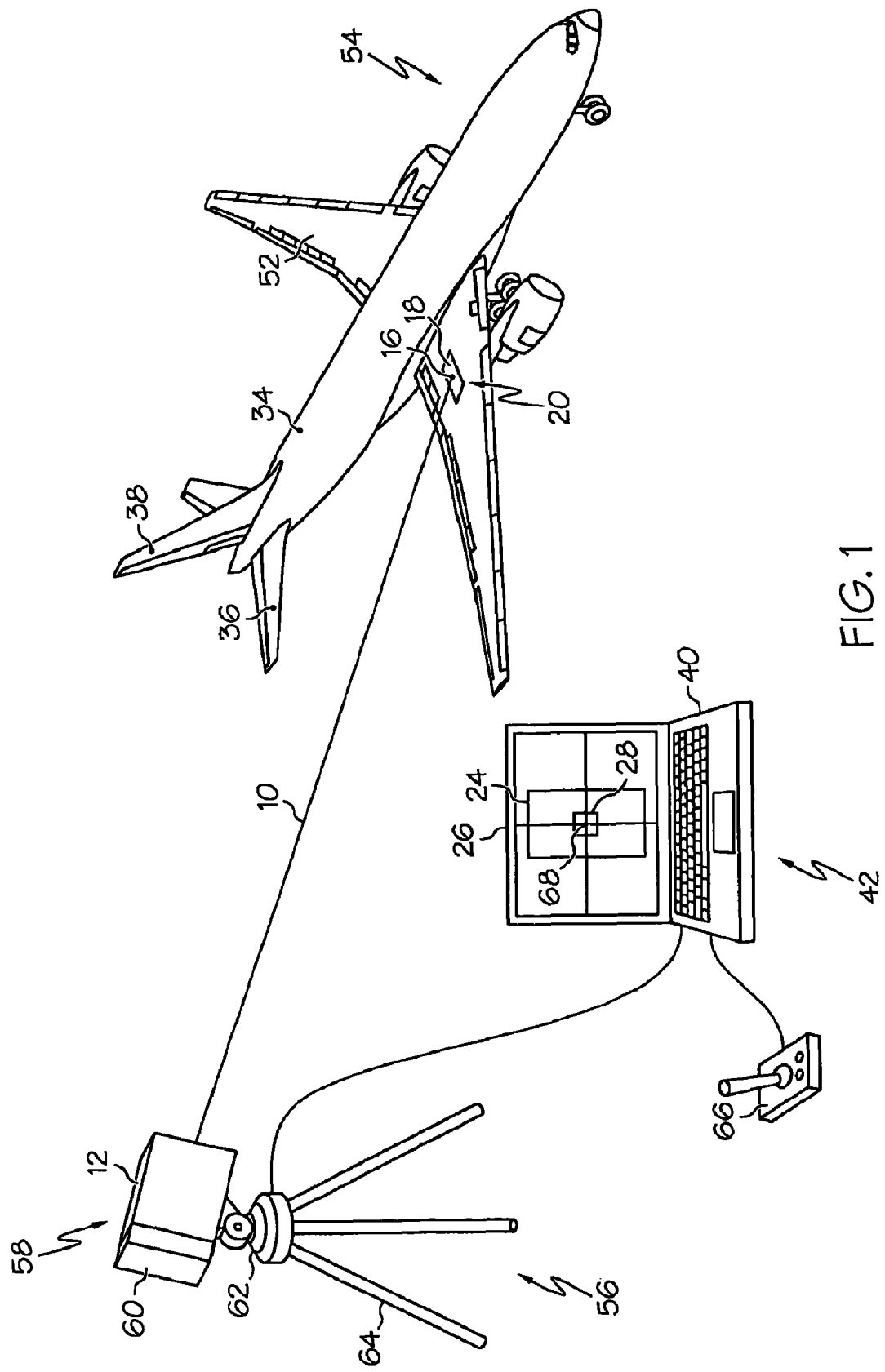
Figure 2:
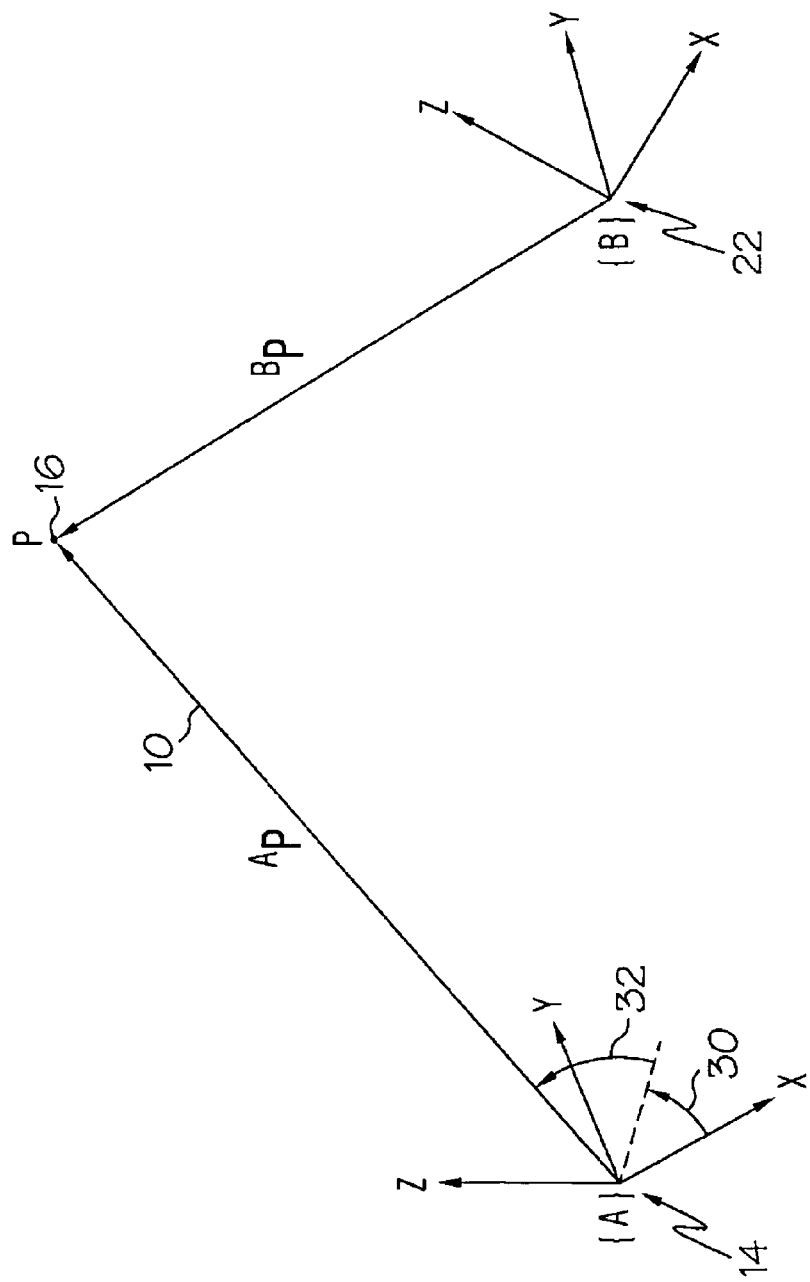
Figure 3:
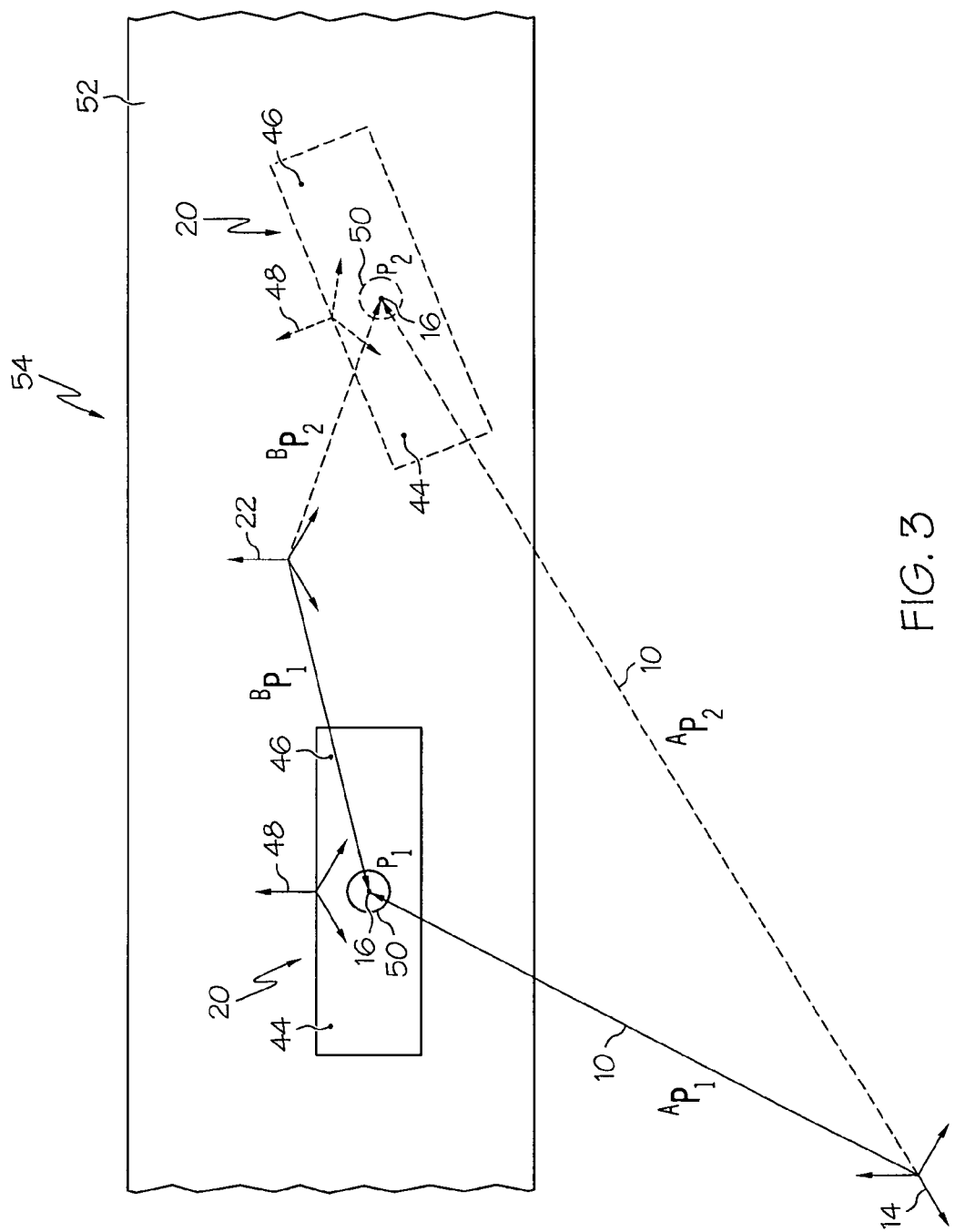
FIG. 3 is a diagram, as in FIG. 2, with the target object shown in solid line corresponding to a first position of the target object, with the target object also shown in phantom corresponding to the target object having moved to a second position, and wherein the target object includes an inspection sensor and has moved on a surface of an airplane (only a portion of which is shown)

With reference to the illustrative embodiment of FIG. 1 and the diagrams of FIGS. 2-3, a first method is for controlling orientation of an aim point axis 10 of a video camera 12 having an instrument coordinate system 14 to track a point of interest 16 on a surface 18 of a movable target object 20 and for calculating positions of the point of interest 16 in a local coordinate system 22 in which the target object 20 is moving, wherein the video camera 12 captures a pixel-based image 24 including at least a portion of the target object 20 including the point of interest 16 when the aim point axis 10 is aligned with the point of interest 16. In one illustration, the pixel-based image 24 is displayed on a monitor 26 as shown in FIG. 1. In a different illustration, the pixel-based image 24 is not displayed but exists as pixel-based image data in a memory of a processor embedded, for example, in the video camera 12. The first method includes steps a) through l).

Step a) includes calculating a calibration matrix which transforms a position defined in the instrument coordinate system 14 to a position defined in the local coordinate system 22. Step b) includes aligning the aim point axis 10 of the video camera 12 to a first position $P_1$ of the point of interest 16 in the instrument coordinate system 14 wherein the point of interest 16 is centered on a reference pixel 28 in the pixel-based image 24. In one example, the reference pixel 28 is a center pixel of the pixel-based image 24 and represents the aim point axis 10 of the video camera. Step c) includes measuring pan and tilt angles 30 and 32 of the aim point axis 10 in the instrument coordinate system 14 when the aim point axis 10 is aligned with the first position $P_1$ of the point of interest 16.

Step d) includes measuring a distance substantially along the aim point axis 10 from the video camera 12 to the point of interest 16 corresponding to the first position $P_1$ of the point of interest 16. Step e) includes calculating the first position $P_1$ of the point of interest 16 in the local coordinate system 22 using at least the calibration matrix and the measured pan and tilt angles 30 and 32 and distance corresponding to the first position $P_1$ of the point of interest 16. Step f) includes storing the calculated first position $P_1$ of the point of interest.

Step g) includes determining the point of interest 16 in the pixel-based image 24 and determining a change in pixel position of the point of interest 16 from the reference pixel 28 in the pixel-based image 24 caused by movement of the point of interest 16 to a second position $P_2$ in the local coordinate system 22. Step h) includes calculating a pan angle 30 and a tilt angle 32 in the instrument coordinate system 14 to align the aim point axis 10 of the video camera 12 with the second position $P_2$ of the point of interest 16 in the instrument coordinate system 14 for the aim point axis 10 to become re-centered on the reference pixel 28 in the pixel-based image 24 using at least the determined change in pixel position of the point of interest 16 from the reference pixel 28 in the pixel-based image 24. Step i) includes rotating the aim point axis 10 of the video camera 12 to the calculated pan angle 30 and the calculated tilt angle 32.

Step j) includes measuring a distance substantially along the aim point axis 10 from the video camera 12 to the second position $P_2$ of the point of interest 16. Step k) includes calculating the second position $P_2$ of the point of interest 16 in the local coordinate system 22 using at least the calibration matrix and measured or calculated pan and tilt angles 30 and 32 and the measured distance corresponding to the second position $P_2$ of the point of interest 16. Step l) includes storing the calculated second position $P_2$ of the point of interest 16.

In one application of the first method, step a) includes four sub-steps. One sub-step includes measuring the pan angle 30 and the tilt angle 32 of the aim point axis 10 in the instrument coordinate system 14 when the aim point axis 10 of the video camera 12 is in turn aligned with each of three calibration points 34, 36 and 38 on the surface 18 of the target object 20, wherein positions of the three calibration points 34, 36 and 38 in the local coordinate system 22 are known. Another sub-step includes measuring a distance substantially along the aim point axis 10 from the video camera 12 to each of the three calibration points 34, 36 and 38. Another step includes using forward kinematics of the video camera 12 to convert the corresponding pan, tilt, and distance measurements into Cartesian (X, Y, Z) positions defined in the instrument coordinate system 14. Another sub-step includes calculating the calibration matrix which transforms a position defined in the instrument coordinate system 14 to a position defined in the local coordinate system 22 using at least the Cartesian (X, Y, Z) positions defined in the instrument coordinate system 14 corresponding to the three calibration points 34, 36 and 38. In one variation, the calibration matrix is calculated using no other measurement of orientation of the aim point axis to another calibration point whose position is known in the local coordinate system and using no additional measurement of distance substantially along the aim point axis from the instrument to another calibration point whose position is known in the local coordinate system.

Referring to FIG. 2, when the coordinates of a point P defined in the instrument coordinate system 14 are spherical coordinates of pan (i.e., the pan angle 30 in FIG. 2 of a vector $^AP$ to the point P), tilt (the tilt angle 32 in FIG. 2 of the vector $^AP$ to the point P), and range (the distance along the vector $^AP$ to the point P in FIG. 2), the position of the point P represented as spherical coordinates in the instrument coordinate system 14 is related to the position of the point P in X, Y, Z Cartesian coordinates in the instrument coordinate system 14 from the following equations for the forward kinematics of the video camera 12:

$$X = \text{Range} * \cos(\text{pan}) * \cos(\text{tilt})$$

$$Y = \text{Range} * \sin(\text{pan}) * \cos(\text{tilt})$$

$$Z = \text{Range} * \sin(\text{tilt})$$

where pan (azimuth) is rotation about the Z axis and tilt (elevation) is rotation about the Y axis in the instrument coordinate system 14.

It is noted that the position of the point P represented as Cartesian coordinates (X, Y, Z) in the instrument coordinate system 14 is related to the position of the point P represented as spherical coordinates (pan, tilt, range) in the instrument coordinate system 14 from the following equations for the inverse kinematics of the video camera 12:

$$\text{pan} = \tan(Y, X)^{-1}$$

$$\text{tilt} = \tan(Z, \sqrt{X^2+Y^2})^{-1}$$

$$\text{Range} = \sqrt{X^2+Y^2+Z^2}$$

In one implementation of the first method, a position $^BP$ (which is represented as a column vector in the form $[X,Y,Z,1]^T$) in the local coordinate system 22 is calculated from a position $^AP$ (which is also represented as a column vector in the form $[X,Y,Z,1]^T$) in the instrument coordinate system 14 from the equation:

$$^BP = {}^B_A T \, ^AP$$

where T is the calibration matrix. In one example, the calibration matrix is a 4×4 homogeneous transformation matrix having the form:

$$^B_A T = \begin{bmatrix} r_{11} & r_{12} & r_{13} & X \\ r_{21} & r_{22} & r_{23} & Y \\ r_{31} & r_{32} & r_{33} & Z \\ 0 & 0 & 0 & 1 \end{bmatrix}$$

It is noted that a position $^AP$ in the instrument coordinate system 14 can be calculated from a position $^BP$ in the local coordinate system 22 using the inverse of the calibration matrix from the equation:

$$^AP = ({}^B_A T)^{-1\,B} P = {}^A_B T \, ^BP$$

Figure 4:
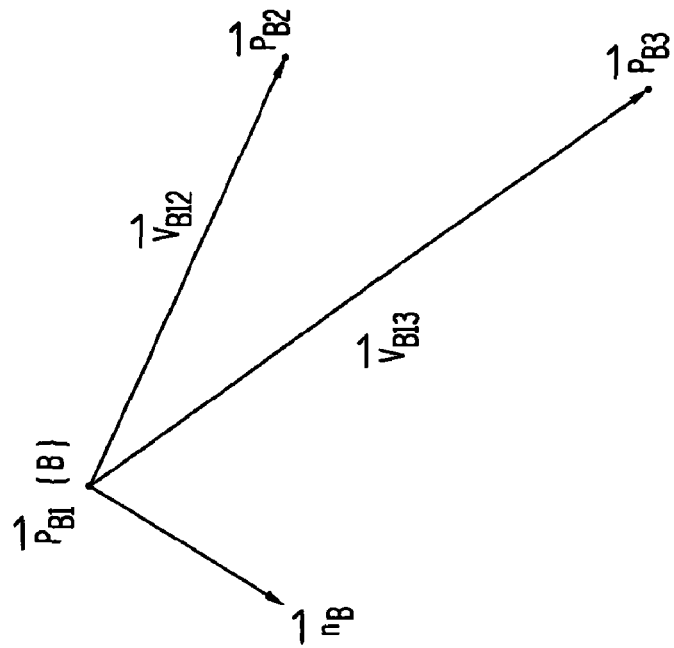
FIGS. 4-6 are explanatory diagrams helpful in understanding an illustrative method for calculating a calibration matrix for coordinate system transformation.
Figure 4:
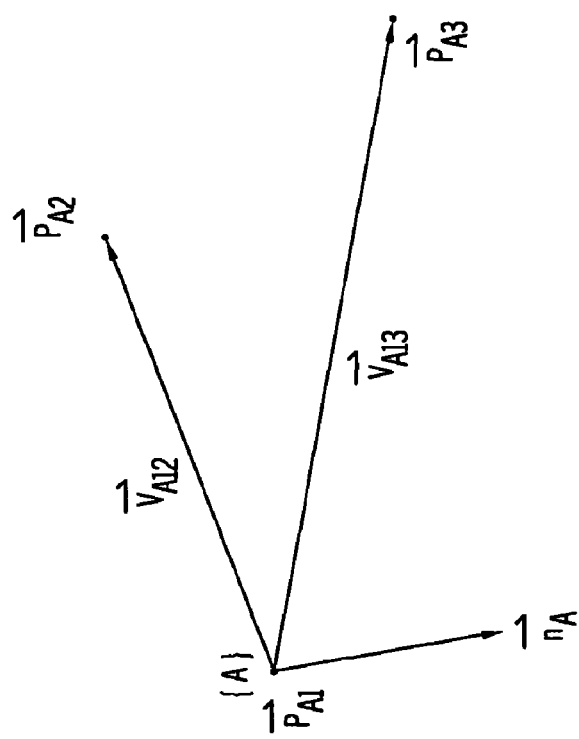
Figure 5:
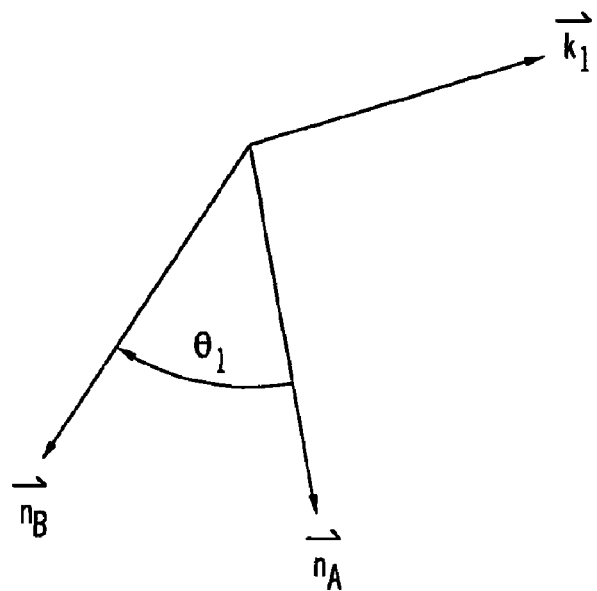
Figure 6:
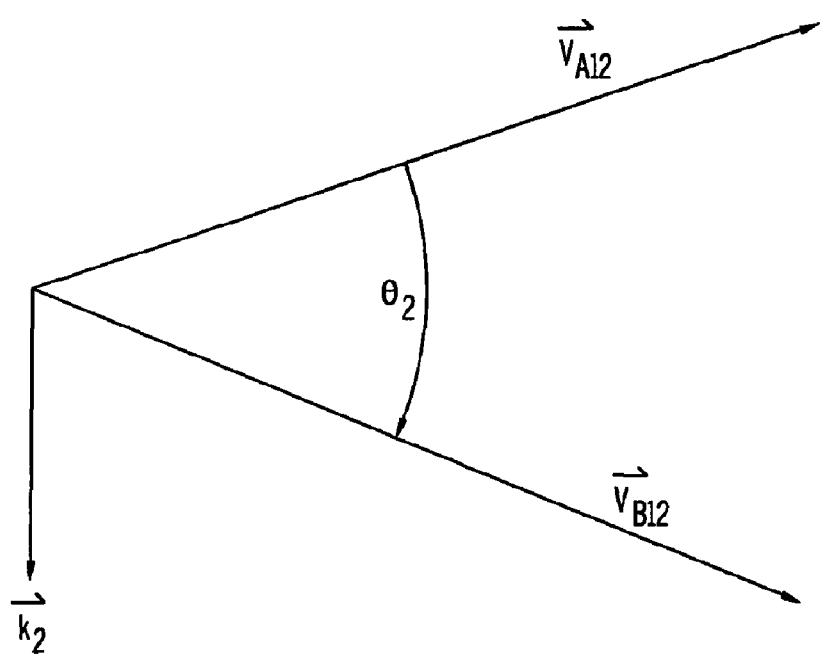

In one illustration, the three calibration points 34, 36 and 38 are non-colinear, and the calibration matrix is calculated as follows:

$$\vec{n}_A = \vec{V}_{A12} \times \vec{V}_{A13}$$

$$\vec{n}_B = \vec{V}_{B12} \times \vec{V}_{B13}$$

$$\vec{k}_1 = \vec{n}_A \times \vec{n}_B$$

$$\theta_1 = a\cos(|\vec{n}_A| \bullet |\vec{n}_B|)$$

$$R_1 = f_1(|\vec{k}_1|, \theta_1)$$

$$\vec{k}_2 = \vec{V}_{A12} \times \vec{V}_{B12}$$

$$\theta_2 = a\cos(|\vec{V}_{A12}| \bullet |\vec{V}_{B12}|)$$

$$R_2 = f_1(|\vec{k}_2|, \theta_2)$$

$$R_{12} = R_1 R_2$$

$$^B_A T = [R_{12}, [R_1 \vec{V}_{B12} - \vec{V}_{A12}]^T]$$

$$^A_B T = ({}^B_A T)^{-1}$$

wherein, referring to FIGS. 4-6:

$\vec{V}_{A12}$ is the vector in coordinate system A created from points $\vec{P}_{A1}$ and $\vec{P}_{A2}$ (i.e., $\vec{V}_{A12} = \vec{P}_{A2} - \vec{P}_{A1}$);

vectors $\vec{V}_{A13}$, $\vec{V}_{B12}$, $\vec{V}_{B13}$ follow the same format;

$\vec{n}_A$ and $\vec{n}_B$ are the normals created from the vector cross products;

$\vec{k}_1$ and $\vec{k}_2$ are axes of rotation;

$\theta_1$ and $\theta_2$ are rotation angles about axes $\vec{k}_1$ and $\vec{k}_2$, respectively;

$R_1$, $R_2$, and $R_{12}$ are 3×3 symmetric rotation matrices; and $f_1(\ )$ is the function (known to those skilled in the art and described, for example, in "Introduction to Robotics: Mechanics and Control", 3rd edition, by John J. Craig and published July 2004 by Prentice Hall Professional Technical Reference) which generates a 3×3 rotation matrix from the angle-axis definition described below:

$$f_1(\hat{k}, \theta) = \begin{bmatrix} k_x k_x v\theta + c\theta & k_x k_y v\theta - k_z s\theta & k_x k_z v\theta + k_y s\theta \\ k_x k_y v\theta + k_z s\theta & k_y k_y v\theta + c\theta & k_y k_z v\theta - k_x s\theta \\ k_x k_z v\theta - k_y s\theta & k_y k_z v\theta + k_x s\theta & k_z k_z v\theta + c\theta \end{bmatrix}$$

where $c\theta = \cos(\theta)$, $s\theta = \sin(\theta)$, $v\theta = 1 - \cos(\theta)$, and $\hat{k} = [k_x, k_y, k_z]$.

Note that the 4×4 homogeneous calibration matrix $_A^B T$ only needs to be computed once for any position of the video camera 12 relative to the target object 20, and $_A^B T$ can then be used to convert any number of vectors from coordinate system {A} (the instrument coordinate system 14) into coordinate system {B} (the local coordinate system 22). It is also noted that the inverse calibration matrix $_A^B T$ can be calculated by calculating the inverse of the calibration matrix $_A^B T$ or can be calculated directly by switching the order of the vectors in the first equations of the previous paragraph. In FIG. 3, $^A P_1$ is the vector representing the first position of P, the point of interest 16, in coordinate system {A}, $^A P_2$ is the vector representing the second position of P, the point of interest 16, in coordinate system {A}, $^B P_1$ is the vector representing the first position of P, the point of interest 16, in coordinate system {B}, and $^B P_2$ is the vector representing the second position of P, the point of interest 16, in coordinate system {B}.

In other applications of the first method, step a) includes employing image-based algorithms to calculate the calibration matrix which use 5 substantially-coplanar calibration points or 7 non-coplanar calibration points and which can compute the required positions in the instrument coordinate system without the need for distance measurements.

Referring to FIG. 8, one procedure for calculating a pan angle 30 and a tilt angle 32 in the instrument coordinate system 14 to align the aim point axis 10 of the video camera 12 with the second position $P_2$ of the point of interest 16 in the instrument coordinate system 14 for the point of interest 16 to become re-centered on the reference pixel 28 in the pixel-based image 24 uses only the calculated change $\Delta X$ and $\Delta Y$ in pixel position of the point of interest 16 from the reference pixel 28 in the pixel-based image 24. In FIG. 8, $\Delta X$ is related to the desired change in the pan angle 30 and $\Delta Y$ is related to the desired change in the tilt angle 32 to re-center the point of interest 16 on the reference pixel 28 and hence to re-align the aim point axis 10 of the video camera 12 with the second position $P_2$ of the point of interest 16 to track the moving target object 20. In one technique closed-loop feedback control methods can be implemented for continuous position alignment. In one such application of this technique, this type of control can be performed by continuously multiplying any changes in pixel values by proportional feedback gains, and then adding this product to the previous angle values, as shown below:

new pan angle=old pan angle+$K_1(\Delta X)$; and new tilt angle=old tilt angle+$K_2(\Delta Y)$, wherein $K_1$ and $K_2$ are the feedback gains. This process is described in the left branch of the flow diagram of FIG. 7A.

With the proper selection of the feedback gains, the system will converge on the correct values for pan (azimuth) and tilt (elevation) that result in no offset of the point of interest 16 from the reference pixel 28. In one variation, current field of view of the video camera 12 is used in the selection of feedback gains so that at wide zoom settings the feedback rates are higher, corresponding to larger relative motions of the target object 20. In one modification, the point of interest 16 in the pixel-based image 24 is identified by marking the point of interest 16, or placing a marker on the point of interest 16, with a specific color (like bright green or orange) or pattern.

Another procedure to accomplish this re-alignment is to orient the video camera 12 to the correct viewpoint by calculating new pan and tilt angles based on pixel offsets, the current field of view of the lens, and the distance to the target. In ideal conditions, this is a single-step, open-loop control method, but inaccuracies in the field of view measurement and other issues associated with image distortion may require the procedure to perform a small number of iterations in order to achieve convergence. This process is described in the right-side branch of the flow diagram of FIG. 7A In one enactment of the first method, the stored calculated first and second positions are stored in temporary or permanent computer memory 40 of at least one computer 42. FIGS. 7A and 7B together depict an illustration of a process flow diagram which describes one example of a particular method involving real-time tracking of a target object in a local coordinate system in which the target object is moving.

In one employment, the first method also calculates an orientation of the target object 20 about the point of interest 16 in the local coordinate system 22, wherein the first method also includes steps m) through t).

Step m) includes calculating first positions of additional points (only two additional points 44 and 46 are shown in FIG. 3) on the surface 18 of the target object 20 in the instrument coordinate system 14 corresponding to the first position $P_1$ of the point of interest 16 using at least known positions of the additional points 44 and 46 relative to the point of interest 16 in a target object coordinate system 48 and pixel-based positions of the additional points 44 and 46 in the pixel-based image 24 corresponding to the first position $P_1$ of the point of interest 16. Step n) includes calculating a first orientation of the target object 20 about the point of interest 16 in the instrument coordinate system 14 corresponding to the first position $P_1$ of the point of interest 16 using at least the calculated first positions of the additional points 44 and 46 and the point of interest 16 in the instrument coordinate system 14. Step o) includes calculating the first orientation of the target object 20 about the point of interest 16 in the local coordinate system 22 using at least the calibration matrix and the calculated first orientation of the target object 20 about the point of interest 16 in the instrument system 14. Step p) includes storing the calculated first orientation.

Step q) includes calculating second positions of the additional points 44 and 46 on the surface 18 of the target object 20 in the instrument coordinate system 14 corresponding to the second position $P_2$ of the point of interest 16 using at least the known positions of the additional points 44 and 46 relative to the point of interest 16 in the target object coordinate system 48 and the pixel-based positions of the additional points 44 and 46 in the pixel-based image 24 corresponding to the second position $P_2$ of the point of interest 16. Step r)

includes calculating a second orientation of the target object 20 about the point of interest 16 in the instrument coordinate system 14 corresponding to the second position $P_2$ of the point of interest 16 using at least the calculated second positions of the additional points 44 and 46 and the point of interest 16 in the instrument coordinate system. Step s) includes calculating the second orientation of the target object 20 about the point of interest 16 in the local coordinate system 22 using at least the calibration matrix and the calculated second orientation of the target object 20 about the point of interest 16 in the instrument system 14. Step t) includes storing the calculated second orientation.

Referring to FIG. 9, in one usage, the point of interest 16 and the additional points 44 and 46 in the pixel-based image 24 are identified by marking the point of interest 16 and the additional points 44 and 46, or placing markers on the point of interest 16 and the additional points 44 and 46, with specific different colors, wherein the relative positions of the point of interest 16 and the additional points 44 and 46 are known in the target object coordinate system 48. In FIG. 9, Δθ refers to an angular change in orientation of the target object 20 about the point of interest 16 at the second position $P_2$ of the point of interest 16. Although only one angle is shown in FIG. 9, three mutually perpendicular angles of orientation in the instrument coordinate system 14 can be calculated. In a different usage, commercially available or open source software which replaces the point of interest 16 and the additional points 44 and 46 with a 2-D image icon of the target object 20 is used to calculate changes in position and orientation of the target object 20 in the instrument coordinate system 14.

In one arrangement, the target object 20 is a controllably movable target object, and the first method also includes: calculating a position deviation of the calculated first position $P_1$ of the target object 20 from a desired position in the local coordinate system 22; calculating position feedback control signals to be applied to the target object 20 using at least the calculated position deviation; and applying (such as by remote control in one example) the calculated position feedback control signals to the target object 20. In one variation, the first method also includes: calculating an orientation deviation of the calculated first orientation of the target object 20 from a desired orientation in the local coordinate system corresponding to the first position $P_1$; calculating orientation feedback control signals to be applied to the target object 20 using at least the calculated orientation deviation; and applying the calculated orientation feedback control signals to the target object 20.

In one deployment of the first method, the video camera 12 has moved with known translation in the instrument coordinate system 14 while the target object 20 has moved between the first position $P_1$ and the second position $P_2$, and step k) includes using the known translation, as is within the ordinary level of skill of the artisan. In the same or a different employment, the video camera 12 has rotated with known rotation in the instrument coordinate system 14 while the target object 20 has rotated between the first orientation and the second orientation, and step s) also includes using the known rotation, as is within the ordinary level of skill of the artisan.

In one enablement of the first method, the video camera 12 has moved with unknown translation to a new video camera position in the instrument coordinate system 14 while the target object 20 has maintained a stationary position and orientation, and step k) also includes calculating and using a new calibration matrix corresponding to the new video camera position. In the same or a different enablement, the video camera 12 has rotated with unknown rotation in the instrument coordinate system 14 to a new video camera orientation while the target object 20 has maintained a stationary position and orientation, and step s) also includes calculating a new calibration matrix corresponding to the second orientation.

In one implementation of the first method, the target object 20 includes an inspection sensor 50 (see FIG. 3) and is adapted to move on a surface 52 of an airplane 54, and the local coordinate system 22 is a coordinate system of the airplane 54.

Up until this point, the focus of the discussion has been on calculating real-time positions of the point of interest on the target object in the local coordinate system in which it is moving, but the position calculations can also be used to determine (estimated) values of velocity and acceleration of the target object in the local coordinate system when time is also measured. Real-time estimates of velocity and acceleration can be derived from consecutive real-position measurements of the point of interest. For example, values of velocity can be calculated from the equation: $\vec{v}=(\vec{P}_2-\vec{P}_1)/\Delta t$, and values of acceleration can be calculated from the equation: $\vec{a}=(2P_2-P_1-V_1\Delta t)/\Delta t^2$. If a slight delay in the calculation can be tolerated, additional data points can be used to improve the accuracy of the calculated values of the velocity and acceleration. A potential use of this capability would be to determine the velocity (i.e., speed and heading direction) of the target object relative to the pathway on which it is traveling. This data can be obtained independently of the location of the video camera. Thus, in one extension, the first method, also includes calculating values of velocity and acceleration of the target object 20 in the local coordinate system 22.

Referring again to the illustrative embodiment of FIG. 1 and the diagrams of FIGS. 2-3, a second method is for controlling orientation of an aim point axis 10 of a video camera 12 having an instrument coordinate system 14 to track a point of interest 16 on a surface 18 of a movable target object 20 and for calculating positions of the point of interest 16 in a local coordinate system 22, wherein the video camera 12 captures a pixel-based image 24 including at least a portion of the target object 20 including the point of interest 16 when the aim point axis 10 is aligned with the point of interest 16. In one illustration, the pixel-based image 24 is displayed on a monitor 26 as shown in FIG. 1. In a different illustration, the pixel-based image 24 is not displayed but exists as pixel-based image data in a memory of a processor embedded, for example, in the video camera 12. The second method includes steps a) through l).

Steps a), b), f) and l) of the second method are identical to steps a), b), f) and l) of the first method. Steps c) through e) of the second method are identical to steps c) through e) of the first method except that pan and tilt angles and distance in the first method are replaced with first pan and tilt angles and first distance in the second method. Steps g) through k) of the second method are described below.

Step g) includes detecting changes in pixel position of the point of interest 16 from the reference pixel 28 in the pixel-based image 24 caused by movement of the point of interest 16 in the local coordinate system 22. Step h) includes using at least the detected changes in pixel position of the point of interest 16 to continuously adjust the pan angle 30 and the tilt angle 32 of the aim point axis 10 of the video camera 12 in the instrument coordinate system 14 to move the aim point axis 10 of the video camera 12 in a direction toward the point of interest 16 on the target object 20.

Step i) includes measuring a plurality of real-time pan angles 30 and tilt angles 32 of the aim point axis 10 in the instrument coordinate system 14. Step j) includes measuring a plurality of real-time distances substantially along the aim point axis 10 from the video camera 12 to the point of interest 16 when the aim point axis 10 is aligned with the point of interest 16. Step k) includes calculating a plurality of positions of the point of interest 16 in the local coordinate system 22, including a second position $P_2$ of the point of interest 16 in the local coordinate system 22, using at least the calibration matrix and the real-time measurements of the plurality of pan angles 30, tilt angles 32, and distances.

The implementations, applications, arrangements, etc. of the first method are equally applicable to the second method.

Referring again to the illustrative embodiment of FIG. 1 and the diagrams of FIGS. 2-3, a first expression of an embodiment is for a system 56 including an instrument 58 and at least one computer 42. The instrument 58 includes a video camera 12 and a range finder 60. The video camera 12 includes an aim point axis 10 having an adjustable orientation and includes an instrument coordinate system 14. The at-least-one computer 42 is operatively connected to the video camera 12 and the range finder 60. In one illustration, the at-least-one computer 42 is a laptop computer having a monitor 26 on which the pixel-based image 24 is displayed as shown in FIG. 1. In a different illustration, the at-least-one computer is a processor embedded in the instrument 58 wherein the pixel-based image 24 is not displayed but exists as pixel-based image data in a memory of the processor. It is noted that the terminology "video camera" includes any imaging sensor.

The at-least-one computer 42 is adapted to: (1) continuously align the aim point axis 10 of the video camera 12 with a point of interest 16 on a surface 18 of a movable target object 20 using at least pixel-based images 24 which are captured by the video camera 12 and which include the point of interest 16; (2) calculate a calibration matrix which transforms a position in the instrument coordinate system 14 to a position in a local coordinate system 22 in which the target object 20 is moving; (3) receive signals from the instrument 58 corresponding to real-time measurements of orientation of the aim point axis 10 in the instrument coordinate system 14 when the aim point axis 10 is aligned with the point of interest 16; (4) receive signals from the range finder 60 corresponding to real-time measurements of distance from the instrument 58 substantially along the aim point axis 10 to the point of interest 16; (5) calculate a plurality of positions of the point of interest 16 in the local coordinate system 22 using at least the calibration matrix and the real-time measurements of orientation and distance corresponding to the point of interest 16; and (6) store the plurality of calculated positions of the point of interest 16.

In one implementation of the first expression of the embodiment of FIG. 1, the at-least-one computer 42 is adapted to calculate the calibration matrix by: (1) receiving signals from the instrument 58 corresponding to measurements of orientation of the aim point axis 10 in the instrument coordinate system 14 when the aim point axis 10 of the video camera 12 is in turn aligned with each of three calibration points 34, 36 and 38 on the surface 18 of the target object 20, wherein positions of the three calibration points 34, 36 and 38 in the local coordinate system 22 are known; (2) receiving signals from the range finder 60 corresponding to measurements of distance substantially along the aim point axis 10 from the video camera 12 to each of the three calibration points 34, 36 and 38; (3) using forward kinematics of the video camera 12 to convert the corresponding orientation and distance measurements into Cartesian (X, Y, Z) positions defined in the instrument coordinate system 14; and (4) calculating a calibration matrix which transforms a position defined in the instrument coordinate system 14 to a position defined in the local coordinate system 22 using at least the Cartesian (X, Y, Z) positions defined in the instrument coordinate system 14 corresponding to the three calibration points 34, 36 and 38.

In one enablement of the first expression of the embodiment of FIG. 1, the target object 20 is a controllably movable target object, the at-least-one computer 42 is operatively connected (such as, in one example, by wireless communication) to the target object 20, and the at-least-one computer 42 is adapted to: (1) calculate a position deviation of a calculated position of the target object 20 from a desired position in the local coordinate system 22; (2) calculate position feedback control signals to be applied to the target object 20 using at least the calculated position deviation; and (3) apply (such as, in one example, through wireless communication) the calculated position feedback control signals to the target object 20.

In one arrangement of the first expression of the embodiment of FIG. 1, the target object 20 includes an inspection sensor 50 (see FIG. 3). In one variation, the local coordinate system 22 is an airplane coordinate system. In one modification, the range finder 60 is a laser range finder.

In one construction involving the first expression of the embodiment of FIG. 1, the instrument 58 includes a pan and tilt mechanism 62 which is supported by a tripod 64 and which is operably attached to the instrument 58 to allow the video camera 12 to be rotated in pan and tilt. In one variation, the at-least-one computer 42 includes a joy stick input device 66 and a monitor 26. In one modification, the at-least-one computer 42 is programmed to control the pan and tilt mechanism 62 through the joy stick input device 66 for calibration purposes and through a computer program to execute the other method steps, to display the pixel-based image 24 of a field of view of the video camera 12 on the monitor 26, and to overlay a representation 68 (such as the center of cross-hairs) of the aim point axis 10 on the display. In another construction, the tripod is replaced with a rigid attachment of the instrument 58 to a building wall, ceiling, etc.

In one utilization, the system 56 can be set up to be controlled remotely through a network socket connection from another computer or connected through a web server allowing control from any web browser. The remote user could use the remote access to send images back from the camera to perform the calibration. Since many handheld wireless devices have web browsers, this type of control would be available to users in a wide variety of locations.

In one utilization of any of the previously-described methods and system, the point on the surface 52 of an airplane 54 sensed by the inspection sensor 50 of the target object 20 is substantially identical to the position of the point of interest 16 on the target object 20. The inspection sensor 50 (see FIG. 3) indicates to the at-least-one computer 42 when the inspection sensor 50 senses a point on the surface 52 of the airplane 54 needing repair. The stored positions of the point of interest 16 in the local (airplane) coordinate system 22 of the airplane 54 corresponding to the point on the airplane 54 needing repair can be used later to control the pan and tilt angles 30 and 32 of the aim point axis 10 of the video camera 12 in the instrument coordinate system to align the aim point axis 10 with the point on the airplane 54 needing repair to plan the repair procedure. In one variation, the position of the stored point of interest 16 on the target object 20 is adjusted to account for any offset from the point on the airplane 54 needing repair sensed by the inspection sensor 50 using known relative position and orientation of the sensed point from the point of interest.

One method for determining an orientation of an aim point axis 10 of a video camera 12 having an instrument coordinate system 14 for the aim point axis 10 of the video camera 12 to be aligned with a point of interest 16 on a surface 18 of an airplane 54 having a local (airplane) coordinate system 22, wherein a position of the point of interest 10 in the local coordinate system 22 is known is hereinafter described. The method includes calculating a calibration matrix which transforms a position defined in the instrument coordinate system 14 to a position defined in the local coordinate system 22. The method includes calculating an inverse of the calibration matrix. The method includes calculating the orientation (such as the pan angle 30 and the tilt angle 32) of the aim point axis 10 of the video camera 12 in the instrument coordinate system 14 using at least the inverse of the calibration matrix, the position of the point of interest 16 in the local coordinate system 22, and inverse kinematics of the video camera 12. The method includes rotating the aim point axis 10 of the video camera 12 to the calculated orientation.

In one variation, the orientation of the aim point axis 10 of the video camera 12 in the instrument coordinate system 14 is calculated using only the inverse of the calibration matrix, the position of the point of interest 10 in the local coordinate system 22, and inverse kinematics of the video camera 12. In one enactment of the method, the at-least-one computer 42 is programmed to control the pan and tilt mechanism 62 to rotate the aim point axis 10 of the video camera 12 to the calculated orientation.

Several benefits and advantages are derived from one or more of the methods and expression of the first embodiment. In one example, using a pixel-based image for controlling the pan and tilt angles of the aim point axis of the video camera for tracking the target object and using pan and tilt angles and distance substantially along the aim point axis of the video camera together with the calibration matrix for determining position allows for a faster method and a more portable, easier to set up and use, and less costly system for dynamically tracking a target object and determining the position of a point of interest on the target object in a local coordinate system.

The foregoing description of several methods and an expression of an embodiment of the invention has been presented for purposes of illustration. It is not intended to be exhaustive or to limit the invention to the precise forms and steps disclosed, and obviously many modifications and variations are possible in light of the above teaching. It is intended that the scope of the invention be defined by the claims appended hereto.

The invention claimed is:

1. A method for controlling orientation of an aim point axis of a video camera having an instrument coordinate system to track a point of interest on a surface of a movable target object and for calculating positions of the point of interest in a local coordinate system in which the target object is moving, wherein the video camera captures a pixel-based image including at least a portion of the target object including the point of interest when the aim point axis is aligned with the point of interest, the method comprising:

a) calculating a calibration matrix which transforms a position defined in the instrument coordinate system to a position defined in the local coordinate system, including measuring the pan angle and the tilt angle of the aim point axis in the instrument coordinate system when the aim point axis of the video camera is in turn aligned with each of three calibration points on the surface of the target object, wherein positions of the three calibration points in the local coordinate system are known; measuring a distance substantially along the aim point axis from the video camera to each of the three calibration points; and calculating the calibration matrix which transforms a position defined in the instrument coordinate system to a position defined in the local coordinate system using at least the measured pan and tilt angles and distance in the instrument coordinate system corresponding to the three calibration points;

b) aligning the aim point axis of the video camera to a first position of the point of interest in the instrument coordinate system wherein the point of interest is centered on a reference pixel in the pixel-based image;

c) measuring pan and tilt angles of the aim point axis in the instrument coordinate system when the aim point axis is aligned with the first position of the point of interest;

d) measuring a distance substantially along the aim point axis from the video camera to the point of interest corresponding to the first position of the point of interest e) calculating the first position of the point of interest in the local coordinate system using at least the calibration matrix and the measured pan and tilt angles and distance corresponding to the first position of the point of interest;

f) storing the calculated first position of the point of interest;

g) calculating a change in pixel position of the point of interest in the pixel-based image and determining a change in the pixel position of the point of interest from the reference pixel in the pixel-based image caused by movement of the point of interest to a second position in the local coordinate system;

h) calculating a pan angle and a tilt angle in the instrument coordinate system to align the aim point axis of the video camera with the second position of the point of interest in the instrument coordinate system for the aim point axis to become re-centered on the reference pixel in the pixel-based image using at least the determined change in pixel position of the point of interest from the reference pixel in the pixel-based image;

i) rotating the aim point axis of the video camera to the calculated pan angle and the calculated tilt angle;

j) measuring a distance substantially along the aim point axis from the video camera to the second position of the point of interest;

k) calculating the second position of the point of interest in the local coordinate system using at least the calibration matrix and measured or calculated pan and tilt angels and the measured distance corresponding to the second position of the point of interest; and l) storing the calculated second position of the point of interest.

2. The method of claim 1, wherein the target object is a controllably movable target object, and also including:
   calculating a position deviation of a calculated first position of the target object from a desired position in the local coordinate system;
   calculating position feedback control signals to be applied to the target object using at least the calculated position deviation; and
   applying the calculated position feedback control signals to the target object.

3. The method of claim 1, wherein the video camera has moved with known translation in the instrument coordinate system while the target object has moved between the first position and the second position, and wherein step k) includes using the known translation.

4. The method of claim 1, wherein the target object includes an inspection sensor and is adapted to move on a surface of an airplane, and wherein the local coordinate system is a coordinate system of the airplane.

5. The method of claim 1, also including calculating values of velocity and acceleration of the target object in the local coordinate system.

6. A method for controlling orientation of an aim point axis of a video camera having an instrument coordinate system to track a point of interest on a surface of a movable target object and for calculating positions of the point of interest in a local coordinate system in which the target object is moving, wherein the video camera captures a pixel-based image including at least a portion of the target object including the point of interest when the aim point axis is aligned with the point of interest, the method comprising:

a) calculating a calibration matrix that transforms a position defined in the instrument coordinate system to a position defined in the local coordinate system;
  b) aligning the aim point axis of the video camera to a first position of the point of interest in the instrument coordinate system wherein the point of interest is centered on a reference pixel in the pixel-based image;
  c) measuring pan and tilt angles of the aim point axis in the instrument coordinate system when the aim point axis is aligned with the first position of the point of interest;
  d) measuring a distance substantially along the aim point axis from the video camera to the point of interest corresponding to the first position of the point of interest;
  e) calculating the first position of the point of interest in the local coordinate system using at least the calibration matrix and the measured pan and tilt angles and distance corresponding to the first position of the point of interest;
  f) storing the calculated first position of the point of interest;
  g) calculating a change in pixel position of the point of interest in the pixel-based image and determining a change in the pixel position of the point of interest from the reference pixel in the pixel-based image caused by movement of the point of interest to a second position in the local coordinate system;
  h) calculating a pan angle and a tilt angle in the instrument coordinate system to align the aim point axis of the video camera with the second position of the point of interest in the instrument coordinate system for the aim point axis to become re-centered on the reference pixel in the pixel-based image using at least the determined change in pixel position of the point of interest from the reference pixel in the pixel-based image;
  i) rotating the aim point axis of the video camera to the calculated pan angle and the calculated tilt angle;
  j) measuring a distance substantially along the aim point axis from the video camera to the second position of the point of interest;
  k) calculating the second position of the point of interest in the local coordinate system using at least the calibration matrix and measured or calculated pan and tilt angels and the measured distance corresponding to the second position of the point of interest; and
  l) storing the calculated second position of the point of interest;
  m) calculating first positions of additional points on the surface of the target object in the instrument coordinate system corresponding to the first position of the point of interest using at least known positions of the additional points relative to the point of interest in a target object coordinate system and pixel-based positions of the additional points in the pixel-based image corresponding to the first position of the point of interest;
  n) calculating a first orientation of the target object about the point of interest in the instrument coordinate system corresponding to the first position of the point of interest using at least the calculated first positions of the additional points and the point of interest in the instrument coordinate system;
  o) calculating the first orientation of the target object about the point of interest in the local coordinate system using at least the calibration matrix and the calculated first orientation of the target object about the point of interest in the instrument system;
  p) storing the calculated first orientation;
  q) calculating second positions of the additional points on the surface of the target object in the instrument coordinate system corresponding to the second position of the point of interest using at least the known positions of the additional points relative to the point of interest in the target object coordinate system and the pixel-based positions of the additional points in the pixel-based image corresponding to the second position of the point of interest;
  r) calculating a second orientation of the target object about the point of interest in the instrument coordinate system corresponding to the second position of the point of interest using at least the calculated second positions of the additional points and the point of interest in the instrument coordinate system;
  s) calculating the second orientation of the target object about the point of interest in the local coordinate system using at least the calibration matrix and the calculated second orientation of the target object about the point of interest in the instrument system; and
  t) storing the calculated second orientation.

7. The method of claim 6, wherein the target object is a controllably movable target object, and also including:
  calculating an orientation deviation of the calculated first orientation of the target object from a desired orientation in the local coordinate system corresponding to the first position;
  calculating orientation feedback control signals to be applied to the target object using at least the calculated orientation deviation; and
  applying the calculated orientation feedback control signals to the target object.

8. The method of claim 6, wherein the video camera has rotated with known rotation in the instrument coordinate system while the target object has rotated between the first orientation and the second orientation, and wherein step s) also includes using the known rotation.

9. The method of claim 6, wherein the video camera has rotated with unknown rotation in the instrument coordinate system to a new video camera orientation while the target object has maintained a stationary position and orientation, and wherein step s) also includes calculating a new calibration matrix corresponding to the second orientation.

10. The method of claim 6, wherein the target object includes an inspection sensor and is adapted to move on a surface of an airplane, and wherein the local coordinate system is a coordinate system of the airplane.

11. A method for controlling orientation of an aim point axis of a video camera having an instrument coordinate system to track a point of interest on a surface of a movable target object and for calculating positions of the point of interest in a local coordinate system in which the target object is moving, wherein the video camera captures a pixel-based image including at least a portion of the target object including the point of interest when the aim point axis is aligned with the point of interest, wherein the video camera has moved with unknown translation to a new video camera position in the instrument coordinate system while the target object has maintained a stationary position and orientation, the method comprising:

a) calculating a calibration matrix which transforms a position defined in the instrument coordinate system to a position defined in the local coordinate system;
b) aligning the aim point axis of the video camera to a first position of the point of interest in the instrument coordinate system wherein the point of interest is centered on a reference pixel in the pixel-based image;
c) measuring pan and tilt angles of the aim point axis in the instrument coordinate system when the aim point axis is aligned with the first position of the point of interest;
d) measuring a distance substantially along the aim point axis from the video camera to the point of interest corresponding to the first position of the point of interest;
e) calculating the first position of the point of interest in the local coordinate system using at least the calibration matrix and the measured pan and tilt angles and distance corresponding to the first position of the point of interest;
f) storing the calculated first position of the point of interest;
g) calculating a change in pixel position of the point of interest in the pixel-based image and determining a change in the pixel position of the point of interest from the reference pixel in the pixel-based image caused by movement of the point of interest to a second position in the local coordinate system;
h) calculating a pan angle and a tilt angle in the instrument coordinate system to align the aim point axis of the video camera with the second position of the point of interest in the instrument coordinate system for the aim point axis to become re-centered on the reference pixel in the pixel-based image using at least the determined change in pixel position of the point of interest from the reference pixel in the pixel-based image;i) rotating the aim point axis of the video camera to the calculated pan angle and the calculated tilt angle;
j) measuring a distance substantially along the aim point axis from the video camera to the second position of the point of interest;
k) calculating and using a new calibration matrix corresponding to the new video camera position the second position of the point of interest in the local coordinate system using at least the calibration matrix and measured or calculated pan and tilt angles and the measured distance corresponding to the second position of the point of interest; and
l) storing the calculated second position of the point of interest.

12. A method for controlling orientation of an aim point axis of a video camera having an instrument coordinate system to track a point of interest on a surface of a movable target object and for calculating positions of the point of interest in a local coordinate system, wherein the video camera captures a pixel-based image including at least a portion of the target object including the point of interest when the aim point axis is aligned with the point of interest, the method comprising:

a) calculating a calibration matrix which transforms a position defined in the instrument coordinate system to a position defined in the local coordinate system, including measuring the pan angle and the tilt angle of the aim point axis in the instrument coordinate system when the aim point axis of the video camera is in turn aligned with each of three calibration points on the surface of the target object, wherein positions of the three calibration points in the local coordinate system are known; measuring a distance substantially along the aim point axis from the video camera to each of the three calibration points; using forward kinematics of the video camera to convert the corresponding pan, tilt and distance measurements into Cartesian (X, Y, Z) positions defined in the instrument coordinate system; and calculating the calibration matrix which transforms a position defined in the instrument coordinate system to a position defined in the local coordinate system using at least the Cartesian (X, Y, Z) positions defined in the instrument coordinate system corresponding to the three calibration points;
b) aligning the aim point axis of the video camera to a first position of the point of interest in the instrument coordinate system wherein the point of interest is centered on a reference pixel in the pixel-based image;
c) measuring first pan and tilt angles of the aim point axis in the instrument coordinate system when the aim point axis is aligned with the first position of the point of interest;
d) measuring a first distance substantially along the aim point axis from the video camera to the point of interest corresponding to the first position of the point of interest;
e) calculating the first position of the point of interest in the local coordinate system using at least the calibration matrix and the first measured pan and tilt angles and distance corresponding to the first position of the point of interest;
f) storing the calculated first position of the point of interest;
g) detecting changes in pixel position of the point of interest from the reference pixel in the pixel-based image caused by movement of the point of interest in the local coordinate system;
h) using at least the detected changes in pixel position of the point of interest to continuously adjust the pan angle and the tilt angle of the aim point axis of the video camera in the instrument coordinate system to keep the aim point axis of the video camera aligned with the point of interest on the target object;
i) measuring a plurality of pan angles and tilt angles of the aim point axis in the instrument coordinate system;
j) measuring a plurality of distances substantially along the aim point axis from the video camera to the point of interest;
k) calculating a plurality of positions of the point of interest in the local coordinate system, including a second position of the point of interest in the local coordinate system, using at least the calibration matrix and same-time measurements of the plurality of pan angles, tilt angles, and distances; and
l) storing the calculated plurality of positions of the point of interest.

13. The method of claim 12, wherein the target object is a controllably movable target object, and also including:
calculating a position deviation of the calculated first position of the target object from a desired position in the local coordinate system;
calculating position feedback control signals to be applied to the target object using at least the calculated position deviation; and
applying the calculated position feedback control signals to the target object.

14. A system comprising:
a) an instrument including a video camera and a range finder, wherein the video camera includes an aim point axis having an adjustable orientation and includes an instrument coordinate system; and
b) at least one computer operatively connected to the video camera and the range finder, wherein the at-least-one computer is adapted to continuously align the aim point axis of the video camera with a point of interest on a surface of a movable target object using at least pixel-based images which are captured by the video camera and which include the point of interest;

calculate a calibration matrix which transforms a position in the instrument coordinate system to a position in a local coordinate system in which the target object is moving by (i) receiving signals from the range finder corresponding to measurements of distance substantially along the aim point axis from the video camera to each of the three calibration points, (ii) using forward kinematics of the video camera to convert the corresponding orientation and distance measurements into Cartesian (X, Y, Z) positions defined in the instrument coordinate system, and (iii) calculating the calibration matrix which transforms a position defined in the instrument coordinate system to a position defined in the local coordinate system using at least the Cartesian (X, Y, Z) positions defined in the instrument coordinate system corresponding to the three calibration points;

receive signals from the instrument corresponding to real-time measurements of orientation of the aim point axis in the instrument coordinate system when the aim point axis is aligned with the point of interest;

receive signals from the range finder corresponding to real-time measurements of distance from the instrument substantially along the aim point axis to the point of interest;

calculate a plurality of positions of the point of interest in the local coordinate system using at least the calibration matrix and the real-time measurements of orientation and distance corresponding to the point of interest; and store the plurality of calculated positions of the point of interest receiving signals from the instrument corresponding to measurements of orientation of the aim point axis in the instrument coordinate system when the aim point axis of the video camera is in turn aligned with each of three calibration points on the surface of the target object, wherein positions of the three calibration points in the local coordinate system are known.

15. The system of claim 14, wherein the target object is a controllably movable target object, wherein the at-least-one computer is operatively connected to the target object, and wherein the at-least-one computer is operatively connected to the target object, and wherein the at-least-one computer is adapted to:

calculate a position deviation of a calculated position of the target object from a desired position in the local coordinate system;

calculate position feedback control signals to be applied to the target object using at least the calculated position deviation; and apply the calculated position feedback control signals to the target object.

16. The system of claim 15, wherein the target object includes an inspection sensor, and wherein the local coordinate system is an airplane coordinate system.

* * * * *